C. J. CLARKE.
SHORT TURNING TRUCK.
APPLICATION FILED MAY 22, 1915.
1,167,270.
Patented Jan. 4, 1916.
2 SHEETS—SHEET 1.
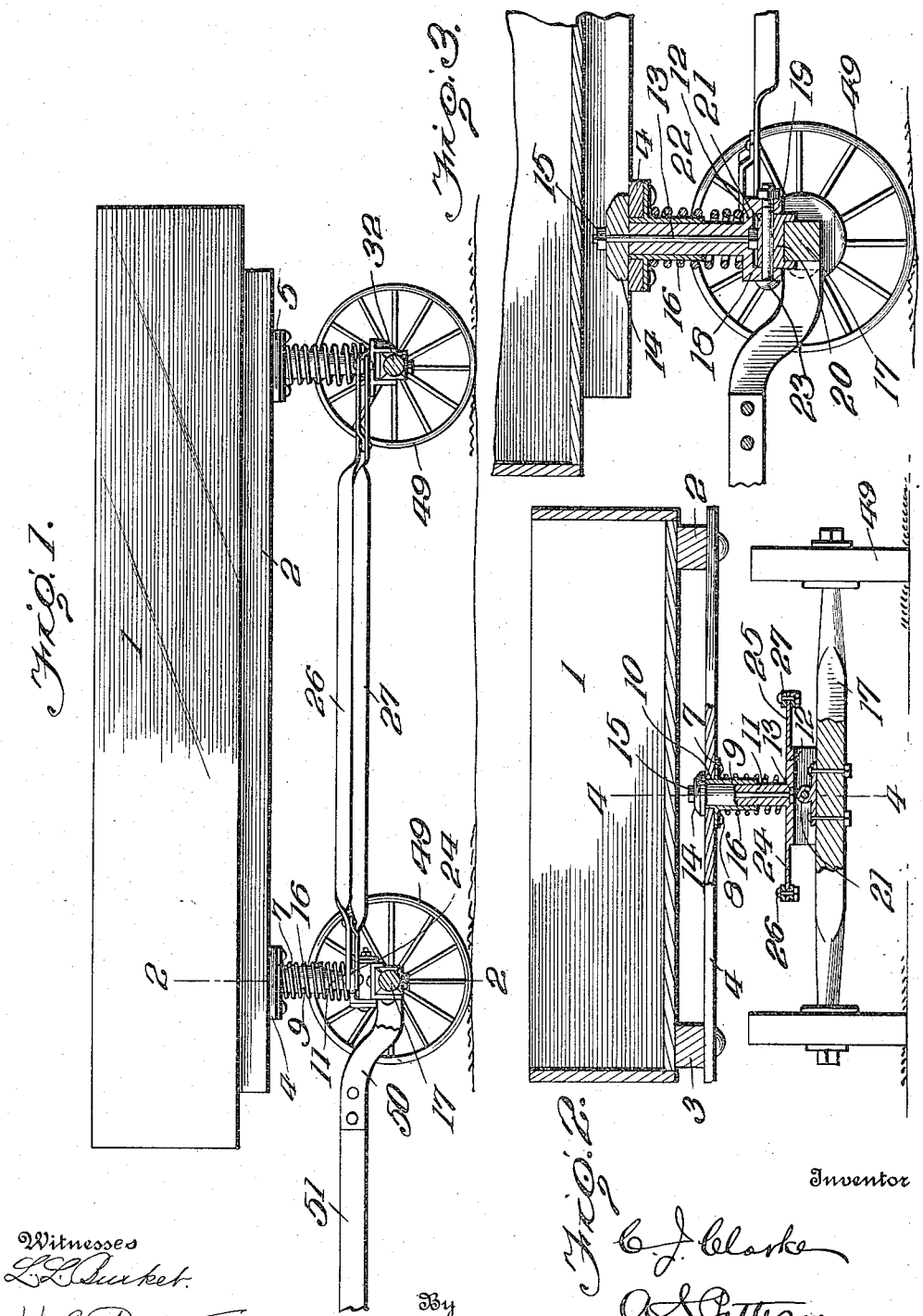
Witnesses
Inventor
C. J. Clarke
By
Attorney

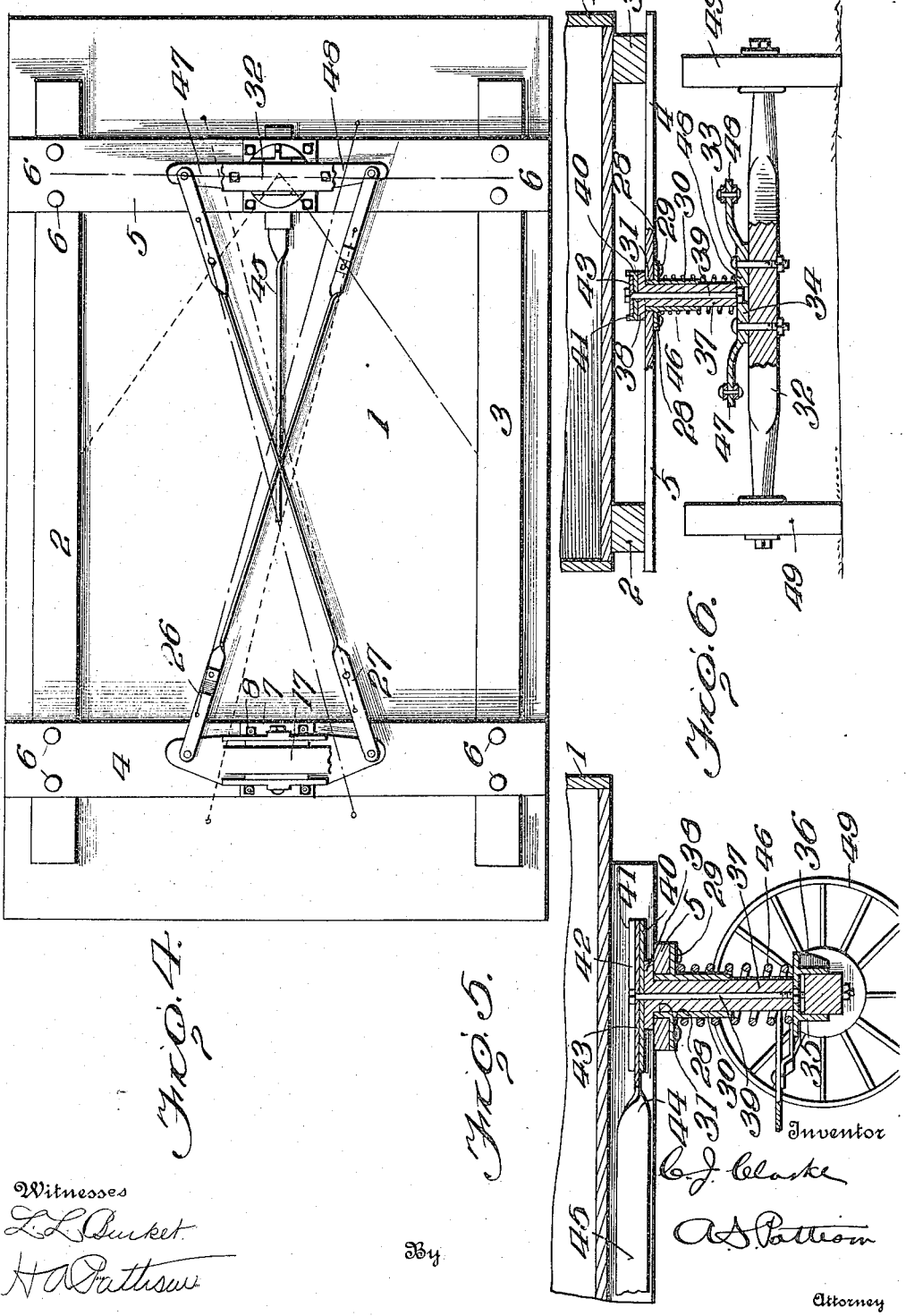

UNITED STATES PATENT OFFICE.

CHARLES JACKSON CLARKE, OF KINGSBURG, CALIFORNIA.

SHORT-TURNING TRUCK.

1,167,270.     Specification of Letters Patent.     Patented Jan. 4, 1916.

Application filed May 22, 1915. Serial No. 29,852.

*To all whom it may concern:*

Be it known that I, CHARLES J. CLARKE, a citizen of the United States, residing at Kingsburg, in the county of Fresno and State of California, have invented certain new and useful Improvements in Short-Turning Trucks, of which the following is a specification, reference being had therein to the accompanying drawing.

My invention relates to improvements in short turning trucks.

The object of my invention is to provide a truck in which both the front and rear axles are pivotally mounted at the center and connected together so that the turning of the pole and the front axle will cause the rear axle to turn in the opposite direction to cause the rear wheels to travel in the same path of track as the front wheels and thus provide a truck in which the rear wheels will clear any object cleared by the front wheels in making a turn.

Another object of my invention is to provide a truck of this character in which the body is vertically movable in respect to the axles and the pivotal connections of the axles with the body serving as guides for allowing the vertical movement between the body and the axles, whereby the necessary spring action is given to the body of the vehicle.

A still further object of my invention is to provide a simple, cheap and effective truck of this character having certain details of structure and combination of parts hereinafter more fully described.

In the accompanying drawings Figure 1 is a side elevation of my improved truck partly in section. Fig. 2 is a transverse sectional view taken on the line 2—2 of Fig. 1. Fig. 3 is a vertical sectional view taken on the line 4—4, of Fig. 2, and at right angles to Fig. 2. Fig. 4 is a bottom plan view showing the axles broken away. Fig. 5 is a vertical longitudinal sectional view of the rear part of the truck showing the means for limiting the movement of the axle. Fig. 6 is a transverse vertical sectional view taken on the line 6—6, of Fig. 1.

I am aware that short turning trucks having vertically movable axle spindles, such as shown in my Letters Patent No. 1,133,838, March 30, 1915, are old and other various forms, but in such devices the spindles are independently movable and these have been found to be very expensive in the manufacture and by pivoting the axles and using said pivot as a means for allowing the vertical movement of the body thereon, I have made a great saving in the cost of the production of a truck of this character. It also means a much more simple and effective structure having certain details later described.

Referring now to the drawings, 1 represents the body of my improved truck which, as shown, is of a rectangular elongated box-like form and supported by two longitudinally extending side-beams 2 and 3. These side-beams can be rigidly secured to the body 1, or secured thereto so that the body can be readily removed when desired, as this forms no part of the present invention. The side-beams 2 and 3 are connected adjacent their ends by the cross-beams 4 and 5, by means of bolts 6, clearly shown in Fig. 4 of the drawings. While I have shown this specific manner of forming a frame for supporting the body 1 of the vehicle, it will be understood that this could be varied without departing from my invention. The forward cross-beam 4, has secured to its lower face, the plate 7, by means of bolts 8, and said plate having rigidly carried thereby a vertically disposed elongated sleeve 9, which has a portion 10 extending above the plate and terminating at a point flush with the upper face of the transverse bar 4. The sleeve 9 extends a considerable distance below the plate 7, and in which is vertically movably mounted the cylindrical member 11, carried by the plate 12. Extending upwardly through the plate 12 and the member 11, is a rod 13, which passes upwardly and is provided with a cap 14, resting upon the upper edge of the portion 10 of the tube 9. Above the cap 14, the bolt 13 is provided with a nut 15, whereby the downward movement of the member 11 within the sleeve 9 is limited, as will be readily understood from Fig. 2 of the drawing. Surrounding the sleeve 9 and bearing against the plate 7 is a coiled spring 16, which has its lower end bearing against the plate 12 and normally holding the plate 7 in its upward position.

It will be seen from the foregoing description that the forward axle 17 supports the plate 12, which will be later described, and that the spring 16 bearing against the plate 7, normally holds the beam 4 upwardly and supports the body of the vehicle in a raised position. The body, however, is allowed a vertical movement by the spring which gives to the body the necessary resiliency for a wagon of this character. The plate 12 is provided with the downwardly extending ears 18 and 19 at the forward and rear edge. The front axle 17 is provided at its upper edge with a plate 20, which straddles the axle and is provided with a central raised portion 21, having the opening 22 extending therethrough transverse the axle and through which extends the bolt 23. This bolt 23 is carried by the ears 18 and 19 and extending transverse the axle allows of the rocking of the axle to provide for the unevenness of the ground over which the truck passes. By this arrangement it will be understood that less twisting motion will be imparted to the body of the truck than would be the case if the axles were rigidly carried by the ears. The plate 12 is provided with the outwardly extending arms 24 and 25, which extend parallel with the axle and above the same, as fully shown in Fig. 2 of the drawing. These arms having pivotally connected to their outer ends the rods or bars 26 and 27, the operation and purpose of which will be later described.

The rear cross-beam 5 is provided with a plate 28, secured to the lower face of the beam by bolts 29. This plate carries a rigid downwardly extending sleeve 30, which has its upper end 31 extending beyond the upper face of the plate 28, and through the beam 4 and terminating at a point flush with the upper face of the beam. The rear axle 32 has bolted thereto by means of bolts 33 a plate 34, which has at its front and rear faces the downwardly extending ears 35 and 36, which are adapted to straddle the axle and by means of which the plate is firmly locked thereto. Rigidly carried by the upper face of the plate 34 is a cylindrical member 37, which extends upwardly through the sleeve 30 and has rigidly carried by its upper end a cap 38, resting upon the extension 31 of the sleeve. Passing upwardly through the cylindrical member 37 is a bolt 39, which is adapted to lock the cap to the upper end of the cylindrical member. Carried by the bolt above the cap is an elongated plate 40 which is provided with upwardly turned side portions 41, forming a channel 42. Fitting within this channel 42 is a plate 43, which extends forwardly and is twisted at 44, so that the forward end 45 is in a vertical position and when the rear axle 32 oscillates the outer end of the portion 45 engages one of the side-beams 2 or 3 and limits the movement of the rear and front axle 32 and 17. Surrounding the sleeve 30 and having its upper end bearing against the plate 28 is a coiled spring 46, which has its lower end bearing against the plate 34, and whereby the body is supported in its upper position under spring tension. By this arrangement it will be seen that the rear end of the body is vertically movable for the same reasons stated in respect to the forward end.

The plate 34 is provided with outwardly extended arms 47 and 48, which extend outwardly over the axle and parallel thereto. The bar 27 extends rearwardly and diagonally of the body of the vehicle and has its rear end connected to the arm 47, while the bar 26 crosses the bar 27 and has its rear end connected to the outer end of the arm 48. By this arrangement it will be seen that when the front axle is turned in either direction the rear axle will be moved in the reverse direction through the medium of the rods 26 and 27, and thus the rear wheels of the vehicle will clear any object cleared by the front wheels. Carried by the axles 17 and 31 are the wheels 49. The axle 17 is provided with thill irons 50 to which is connected the pole 51. While I have shown a pole connected to the thill iron, it will be understood that in the event of a one-horse vehicle, shafts will be substituted therefor.

Having thus described my invention, what I claim and desire to secure by Letters Patent is—

1. A short turning truck comprising a body, downwardly extending sleeves carried by the body at the forward and rear ends, cylindrical members carried by the front and rear axles and extending through the sleeve and vertically movable therein, and springs surrounding the cylindrical members for holding the axles and body separated.

2. A short turning truck comprising a body, downwardly extending sleeves at the center of the body at its front and rear ends, cylindrical members carried by the axles and extending upwardly through the sleeves and having a headed portion above the sleeve and vertically movable therein, springs surrounding the sleeves and normally holding the body in an upward position, and bars connecting the front and rear axles whereby the rear axle is moved in the reverse direction from that of the forward axle, substantially as shown and described.

3. A short turning truck comprising a body, pivoted axles carried by the body, spring means for surrounding the pivots of the axles for allowing the body to move vertically, means connecting the front and rear axles whereby the rear axles turn in the opposite direction from that of the front axles.

4. A short turning truck comprising a body, sleeves carried by the lower face of the body, axles below the body, vertically disposed members carried by the centers of the axles and vertically movable in the sleeves, springs surrounding the sleeves between the body and the axles, and means connecting the front and rear axles whereby the rear axle is moved in the opposite direction from that of the forward axle.

5. A short turning truck comprising a body, vertically arranged sleeves carried by the center of the truck adjacent its ends, axles, vertically disposed members carried by the axles and telescoping within the sleeves, springs surrounding the sleeves and normally supporting the body, and rods connecting the rear and front axles whereby the rear axle is moved in the opposite direction to the movement of the forward axle.

6. A short turning truck comprising a body, a vertically disposed sleeve at the center of the body, a vertically disposed member pivotally connected to the front axle and telescoping within the sleeve, a vertically disposed sleeve carried by the body at the rear, a vertically disposed member rigidly carried by the rear axle and telescoping within the sleeve, springs surrounding the sleeves and normally supporting the body, rods connected to the forward axle on each side of its pivot and crossed, and pivotally connected to the rear axle on opposite sides of its pivot, whereby the movement of the forward axle imparts an opposite movement to the rear axle.

7. A short turning truck comprising a body, a vertically disposed sleeve carried by the center of the body adjacent its forward end, a vertically disposed member telescoping within the sleeve, a spring surrounding the sleeve, an axle pivoted to the lower end of the vertically disposed member, a sleeve carried by the rear end of the body, an axle having a vertically disposed member telescoping within the sleeve, and a spring surrounding the sleeve, rods pivotally connected to arms carried by the vertically disposed member carried by the front axle and crossed and pivotally connected to the rear axle whereby the rear axle moves in the opposite direction to that of the movement of the forward axle.

8. A short turning truck comprising a body, a sleeve carried by the center of the body adjacent its forward end, a front axle, a plate horizontally pivoted to the front axle, a vertically disposed member carried by said plate and telescoping within the sleeve carried by the forward end of the body, a spring surrounding the sleeve and engaging the body and the plate, a rear axle, a plate rigidly secured to said axle, a vertically disposed member carried by the plate, a sleeve carried by the body portion and telescoping around the said vertically disposed member, outwardly extending arms carried by the plates carried by the front and rear axles, rods connecting the said arms, and a stop carried by the upper end of the vertically disposed member carried by the rear axle, whereby the movement of the axles are limited.

9. A short turning truck comprising a body, a vertically disposed sleeve carried by the center of the body adjacent its forward end, a vertically disposed member telescoping within the sleeve, a spring surrounding the sleeve, an axle pivoted to the lower end of the vertically disposed member, a sleeve carried by the rear end of the body, an axle having a vertically disposed member telescoping within the sleeve, a spring surrounding the sleeve, and means connecting the rear and front axle, whereby the rear axle moves in the opposite direction to that of the forward axle.

In testimony whereof I hereunto affix my signature in the presence of two witnesses.

CHARLES JACKSON CLARKE.

Witnesses:
  C. F. DRAPER,
  A. S. LINDGREN.

Copies of this patent may be obtained for five cents each, by addressing the "Commissioner of Patents, Washington, D. C."